United States Patent [19]

Takatori et al.

[11] Patent Number: 5,355,438

[45] Date of Patent: Oct. 11, 1994

[54] WEIGHTING AND THRESHOLDING CIRCUIT FOR A NEURAL NETWORK

[75] Inventors: Sunao Takatori; Ryohei Kumagai; Koji Matsumoto; Makoto Yamamoto, all of Tokyo, Japan

[73] Assignee: Ezel, Inc., Tokyo, Japan

[21] Appl. No.: 51,818

[22] Filed: Apr. 26, 1993

Related U.S. Application Data

[63] Continuation of Ser. No. 596,024, Oct. 11, 1990, abandoned.

[30] Foreign Application Priority Data

Oct. 11, 1989 [JP] Japan .................. 1-264707

[51] Int. Cl.⁵ .................. G06F 15/46; G06F 11/00
[52] U.S. Cl. .................. 395/24; 307/201
[58] Field of Search .................. 395/24, 23, 22; 307/201

[56] References Cited

U.S. PATENT DOCUMENTS

| | | | |
|---|---|---|---|
| 3,097,349 | 7/1963 | Putzrath et al. | 340/172.5 |
| 3,103,648 | 9/1963 | Hartmanis | 340/172.5 |
| 3,158,840 | 11/1964 | Baskin | 340/172.5 |
| 3,165,644 | 1/1965 | Clapper | 307/88.5 |
| 3,209,328 | 9/1965 | Bonner | 340/146.3 |
| 3,218,475 | 11/1965 | Hiltz | 307/88.5 |
| 3,230,351 | 1/1966 | Platt et al. | 235/151 |
| 3,238,504 | 3/1966 | Crane | 340/172.5 |
| 3,250,918 | 5/1966 | McGrogan, Jr. | 307/88.5 |
| 3,273,125 | 9/1966 | Jakowatz | 340/172.5 |
| 3,275,986 | 9/1966 | Dunn et al. | 340/146.3 |
| 3,280,257 | 10/1966 | Orthuber et al. | 179/1 |
| 3,283,229 | 11/1966 | Lindahl | 318/18 |
| 3,284,772 | 11/1966 | Stewart | 340/146.3 |
| 3,284,780 | 11/1966 | Clapper | 340/172.5 |
| 3,287,615 | 11/1966 | Smyth | 318/28 |
| 3,287,649 | 11/1966 | Rosenblatt | 328/55 |
| 3,310,783 | 3/1967 | Putzrath | 340/172.5 |
| 3,310,784 | 3/1967 | Hilinski | 340/172.5 |
| 3,311,895 | 3/1967 | Clapper | 340/172.5 |
| 3,317,900 | 5/1967 | Clapper | 340/172.5 |
| 3,317,901 | 5/1967 | Clapper | 340/172.5 |
| 3,324,457 | 6/1967 | Ogle et al. | 340/172.5 |

(List continued on next page.)

OTHER PUBLICATIONS

"Neural Networks for Switching", Brown et al, 1989 IEEE.
"Neural Networks using Analog Multipliers", Hollis et al, 1988 IEEE, SCAS 88.
Garda et al. "An Analog Chip Set for Multi-Layered Synchronous Boltzmann Machines", *INNC 90 Paris Internat. Neural Network Conf.*, Jul. 9–13 1990, pp. 585–588.
Graf et al. "VLSI Implementation of a Neural Network Model", *IEEE Computer*, Mar. 1988, pp. 41–49.
Van Den Bout et al. "A Stochastic Architecture for Neural Nets", *IEEE Internat. Conference on Neural Networks*, Jul. 24–27, 1988, pp. 1–481–488.
Bibyk et al. "Issues in Analog VLSI and MOS Techniques for Neural Computing", *Analog VLSI Implementation of Neural Systems*, Mead et al, Kluner, May 8, 1989, pp. 103–132.
Verleysen et al., "An Analog VLSI Implementation of Hopfield's Neural Network", *IEEE Micro*, Dec. 1989, pp. 46–55.

*Primary Examiner*—Allen R. MacDonald
*Assistant Examiner*—George Davis
*Attorney, Agent, or Firm*—Cushman, Darby & Cushman

[57] ABSTRACT

An analog circuit which performs weighting and thresholding for a neural network. Each neuron of the neural network includes an operational amplifier receiving an input signal, the output of which is connected to a transistor. The transistor conducts only when the output exceeds a predetermined value thereby providing a threshold function. The output of the transistor is connected by a variable resistance to other inputs of other neurons. The output of each operational amplifier thereby corresponds to a weighted version of the input signal, which is adjusted for threshold and is also dependent on other neurons of the network.

16 Claims, 1 Drawing Sheet

U.S. PATENT DOCUMENTS

| | | | |
|---|---|---|---|
| 3,325,787 | 6/1967 | Angell et al. | 340/172.5 |
| 3,333,248 | 7/1967 | Greenberg et al. | 340/172.5 |
| 3,333,249 | 7/1967 | Clapper | 340/172.5 |
| 3,341,821 | 9/1967 | Kessler | 340/172.5 |
| 3,341,823 | 9/1967 | Connelly | 340/172.5 |
| 3,351,783 | 11/1967 | Harris et al. | 307/88.5 |
| 3,355,717 | 11/1967 | Cote, Jr. | 340/172.5 |
| 3,408,627 | 10/1968 | Kettler et al. | 340/172.5 |
| 3,414,735 | 12/1968 | Harris et al. | 307/201 |
| 3,435,422 | 3/1969 | Gerhardt et al. | 340/172.5 |
| 3,440,617 | 4/1969 | Lesti | 340/172.5 |
| 3,496,382 | 2/1970 | Hendrix | 307/201 |
| 3,533,072 | 10/1970 | Clapper | 340/172.5 |
| 3,548,202 | 12/1970 | Ide et al. | 307/201 |
| 3,568,075 | 3/1971 | Dusbeck et al. | 328/146 |
| 3,599,009 | 8/1971 | Parmentier et al. | 307/210 |
| 3,601,811 | 8/1971 | Yoshino | 340/172.5 |
| 3,602,888 | 8/1971 | Nishiyama et al. | 340/172.5 |
| 3,638,196 | 1/1972 | Nishiyama et al. | 340/172.5 |
| 3,691,400 | 9/1972 | Askew | 307/201 |
| 3,701,974 | 10/1972 | Russell | 340/172.5 |
| 3,950,733 | 4/1976 | Cooper et al. | 395/24 |
| 3,979,602 | 9/1976 | Reible | 307/201 |
| 4,044,243 | 8/1977 | Cooper et al. | 364/900 |
| 4,163,983 | 8/1979 | Cline et al. | 357/12 |
| 4,247,892 | 1/1981 | Lawrence | 364/200 |
| 4,254,474 | 3/1981 | Cooper et al. | 364/900 |
| 4,319,331 | 3/1982 | Elbaum et al. | 364/515 |
| 4,326,259 | 4/1982 | Cooper et al. | 364/715 |
| 4,450,530 | 5/1984 | Llinas et al. | 364/413 |
| 4,518,866 | 5/1985 | Clymer | 307/201 |
| 4,660,166 | 4/1987 | Hopfield | 364/807 |
| 4,694,418 | 9/1987 | Ueno et al. | 364/807 |
| 4,716,540 | 12/1987 | Yamakawa | 364/807 |
| 4,719,591 | 6/1988 | Hopfield et al. | 364/807 |
| 4,730,259 | 3/1988 | Gallant | 364/415 |
| 4,731,747 | 3/1988 | Denker | 364/807 |
| 4,737,929 | 4/1988 | Denker | 395/27 |
| 4,739,496 | 4/1988 | Marom et al. | 365/125 |
| 4,748,674 | 5/1988 | Freeman | 382/15 |
| 4,750,153 | 6/1988 | Owechko et al. | 365/125 |
| 4,752,906 | 6/1988 | Kleinfeld | 364/807 |
| 4,760,437 | 7/1988 | Denker et al. | 357/30 |
| 4,760,604 | 7/1988 | Cooper et al. | 382/15 |
| 4,762,397 | 8/1988 | Pepper | 350/331 R |
| 4,766,568 | 8/1988 | McGregor et al. | 365/49 |
| 4,773,024 | 9/1988 | Faggin et al. | 364/900 |
| 4,774,677 | 9/1988 | Buckley | 382/15 |
| 4,792,460 | 12/1988 | Chu et al. | 427/35 |
| 4,792,915 | 12/1988 | Adams et al. | 364/724.19 |
| 4,796,199 | 1/1989 | Hammerstrom et al. | 395/24 |
| 4,799,149 | 1/1989 | Wolf | 364/200 |
| 4,800,519 | 1/1989 | Grinberg et al. | 364/822 |
| 4,802,103 | 1/1989 | Faggin et al. | 364/900 |
| 4,803,736 | 2/1989 | Grossberg et al. | 382/15 |
| 4,805,225 | 2/1989 | Clark | 382/15 |
| 4,807,168 | 2/1989 | Moopenn et al. | 307/201 |
| 4,809,193 | 2/1989 | Jourjine | 364/200 |
| 4,849,925 | 7/1989 | Peckerar et al. | 364/819 |
| 4,926,064 | 5/1990 | Tapang | 395/23 |
| 4,988,891 | 1/1991 | Mashiko | 395/24 |
| 4,999,525 | 3/1991 | Park et al. | 395/24 |
| 5,068,662 | 11/1991 | Guddanti et al. | 395/22 |
| 5,103,496 | 4/1992 | Andes et al. | 395/24 |
| 5,259,038 | 11/1993 | Sakou et al. | 382/14 |

WEIGHTING AND THRESHOLDING CIRCUIT FOR A NEURAL NETWORK

This is a continuation of application No. 07/596,024, filed on Oct. 11, 1990, which was abandoned upon the filing hereof.

FIELD OF THE INVENTION

The present invention relates to a data processing system of the neural network type.

PRIOR ART

Since the Macalloch-Pitts moedel, a fundamental model for a neural network has an output of a normalized digital value. A digital circuit for the model can easily be designated from the theoretical point of view. However, a huge size circuit will be necessary for performing all necessary operations by a digital circuit. These necessary operations include comparison, addition and multiplication of a large number of terms, as well as subtraction.

$$\phi\left\{\left(\sum_i w_i A_i\right) - \theta\right\} \quad (1)$$

$\phi$: Normalization function
$w_i$: Weight of the $i$th synapse
$A_i$: Input to the $i$th synapse
$\theta$: Threshold of neuron Accordingly, it is difficult to expand the number of neurons up to a practical level in an IC and it is difficult to make such an IC due to a practical limitation in the number of gates that can be used.

Therefore, trials for the contraction of the neural network by analog circuit has been proposed by the U.S. Pat. Nos. 4,660,166; 4,719,591; and 4,731,747.

The neural network disclosed in the above publications has the structure to control each input to an operation amplifier at the condition of total unification by variable resistance, and evaluates the following energy formula:

$$E = (\tfrac{1}{2})\Sigma_i\Sigma_j T_{ij}V_iV_j + \Sigma(I_i/R_i)\int_o^{vi} g_i^{-1}(V)dV - \Sigma_i I_iV_i$$

The above proposed neural network is effective for the calculation of exceedingly small values or exceedingly great values with respect to the variable given by the equivalent function to the above energy formula, so as to be used as, for example, a key to a solution for the problems of a traveling salesman.

However, the neural network of this type lacks in normalization with respect to each neuron; i.e., the function outputting the digital value according to the comparison result with a threshold, so that the functions: information compression, arrangement and integration; with respect to the neural network of a bionic system cannot be realized. Therefore, it is impossible to obtain the essential effect of the neural network by the neural network of this type that an appropriate output pattern is generated in accordance with the input pattern.

SUMMARY OF THE INVENTION

The present invention is invented so as to solve the above problems of the prior art and has an object to provide a data processing system realizable as an integrated circuit as well as comprising a function for normalization.

A data processing system according to the present invention comprises:

a plurality of operational amplifiers;

a plurality of input leading wires supplying input signals to each operational amplifier, respectively;

a plurality of switching circuits connected with each said operational amplifier outputting signals, respectively, when value of output signals for each operational amplifier exceeds the predetermined value;

an output leading wire connected with the above switching circuits supplying output signals of the above each switching circuit to an input side of said operational amplifiers through variable resistance as well as outputting them to the outside.

When a value of the output signal from each operational amplifier exceeds a predetermined value, a signal is output from the switching circuit connected to the above operational amplifier, then such signal is input to each operational amplifier through a variable resistance. Output signal from each switching circuit is to be input to operational amplifier as well as to be output to the outside of a data processing system.

Figure 1:
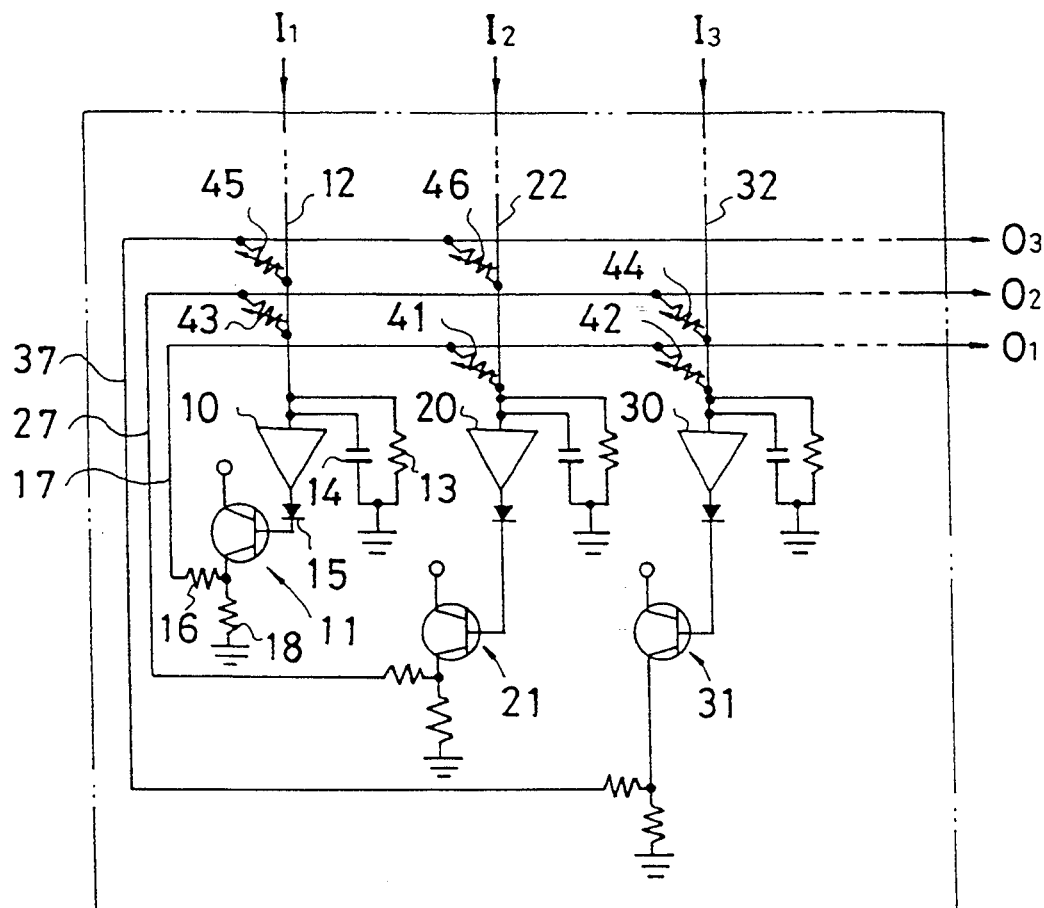
FIG. 1 shows a circuit diagram of an embodiment of a data processing system according to the present invention.

10, 20, 30 . . . Operation Amplifier
11, 21, 31 . . . Switching Circuit
12, 22, 32 . . . Input Leading Wire
17, 27, 37 . . . Output Leading Wire
41 to 46 . . . Variable Resistance

PREFERRED EMBODIMENT OF THE PRESENT INVENTION

Hereinafter, an embodiment of the data processing system according to the present invention is described with reference to the attached drawings.

Although only three operational amplifiers are shown in this diagram for simplification, many more operational amplifiers can be provided in practice. According to the present embodiment, processing is performed on three output data I1, I2 and I3, then three data 01, 02 and 03 are output.

The combination of each operational amplifier 10, 20, 30 and switching circuit 11, 21, 31 corresponds to a neuron of the neural network of an organism, respectively. The connection structure among each operational amplifier corresponds to a so-called neural network. The connection structure of such operational amplifiers is basically equivalent to the circuit of Hopfield disclosed by the specification of the U.S. Pat. No. 4,660,166 except switching circuits 11, 21 and 31.

Hereinafter, the peripheral circuitry of operational amplifier 10 is described. An input leading wire 12 which supplies an input signal to operational amplifier 10 is connected to input terminal of the above operational amplifier 10. Resistance 13 and condenser 14 are connected to the input leading wire 12 in which time constant of operational amplifier 10 is set up. On the other hand, the base of transistor comprising switching circuit 11 is connected to output terminal of the operational amplifier 10. Here, diode 15 for the prevention of a back current to the operational amplifier is provided in between the above base and the operational amplifier 10. A collector of transistor composing switching circuit 11 is connected to a power supply V, and its emitter is connected to output leading wire 17 through resistance 16.

Therefore, a volume of electric current as determined by resistance 16 flows between collector and emitter of transistor when a value of the output signal of operational amplifier 11 exceeds the predetermined value determined by the characteristics of transistor of switching circuit 11; that is, when the base voltage exceeds the predetermined value. An electric current signal output from the above switching circuit 11 is input to operational amplifiers 20 and 30 through output leading wire 17. Output leading wire 17 is connected to input terminals of operational amplifiers 20 and 30 through variable resistances 41 and 42, respectively. This output leading wire is also lead to the outside of this data processing system so as to output signal 01 of switching circuit 11 from the above output leading wire 17.

Switching circuit 11 side of resistance 16 is branched at the middle of output leading wire 17 and connected through protection resistance 18, comprising a larger resistance value than that of resistance 16.

Peripheral structures of the operational amplifiers 20 and 30 are the same as that of operational amplifier 10. Output leading wire 27 is connected to switching circuit 21 which is connected to output terminal of operational amplifier 20. Output leading wire 37 is connected to switching circuit 31 which is connected to output terminal of operational amplifier 30. Output leading wire 27 is connected to operational amplifiers 10 and 30 through variable resistances 43 and 44, respectively. Output leading wire 37 is connected to operational amplifiers 10 and 20 through variable resistances 45 and 46, respectively.

Figure 2:
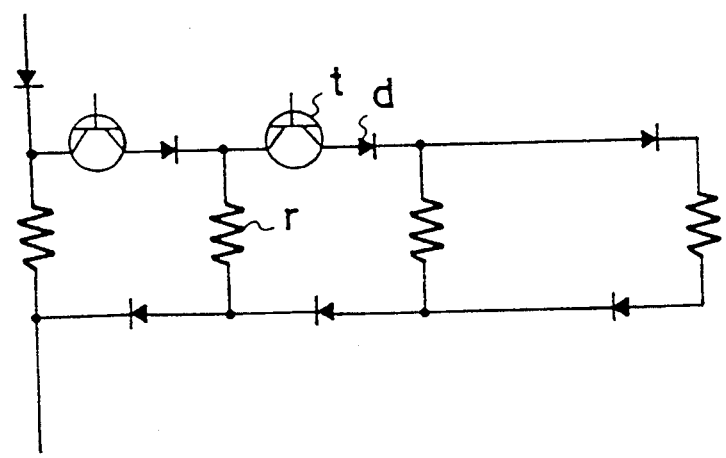
FIG. 2 shows a circuit diagram indicating the status of variable resistance.

It is possible to realize variable resistances 41 to 46 by the structure of, for example, connecting resistances r in parallel through diode d and transistor t, as shown in FIG. 2.

Resistance values of variable resistances 41 to 46 correspond to the weight Wi of the above operation formula (1). An electric current signal supplied to operational amplifiers 10, 20 and 30 through each output leading wire 17, 27, 37 corresponds to input Ai of the formula (1). On the other hand, the characteristics of switching circuits 11, 21 and 31; that is, the basic voltage required for outputting the signal, corresponds to the threshold of the formula (1). Therefore, normalization of neurons, i.e., the function to output signals in accordance with comparison result with threshold is completed.

Accordingly, when input signals I1, I2 and I3 are given, each operational amplifier 10, 20, 30 outputs a voltage signal according to the above input signal. Switching circuit outputs an electric current signal when the above voltage exceeds the predetermined base voltage. An electric signal output from switching circuit is input to another operational amplifier, which is not connected to the base of the original switching circuit, through a variable resistance. According to the above, the output signal is controlled since the input signal with respect to the operational amplifier is charged. Switching circuit connected to the output terminal of the operational amplifier outputs the signal when the value of the above output signal exceed the predetermined value. Output signals 01, 02 and 03 from each switching circuit are output to the outside from this data processing system.

The control system external to this data processing system controls the weights of each neuron, i.e., variable resistances from 41 to 46, according to output signals 01, 02 and 03. As a result, values of signals input to operational amplifiers 10, 20 and 30 are changed and output signals 01, 02 and 03 are changed as action status of switching circuit 11, 21 and 31 are changed. Accordingly, learning control is performed so as to control an output signal to be the predetermined value. Therefore, a circuit comprising a similar ability to perform information processing function of the neural network of an organism is realized by a data processing system according to the present embodiment.

Although switching circuits 11, 21 and 31 consist of transistors, it is not restricted to transistors. It is possible to apply any circuit which comprises the equivalent function as that of transistors.

As mentioned above, it is possible to realize the neural network comprising the normalization function with an analog circuit so as to obtain a data processing system which prepares as many neurons as required at the practical level. Therefore, it is possible to make the neural network into an integrated circuit.

What is claimed is:

1. A neural network system receiving a plurality of inputs and producing a plurality of outputs, said system comprising:

a plurality of interconnected neuron elements, each element comprising an operational amplifier, for amplifying an input signal to produce an output signal;

a threshold switching element, receiving said output signal, said threshold switching element assuming a first predetermined conducting state only when said output signal connected thereto exceeds a threshold, which is greater than zero, of said threshold switching element; and signal summing means, comprising a variable resistor, for summing said output of said threshold switching element with inputs of others of said neuron elements, said input signal of said operational amplifier including a combination of one said input signal and at least two signals from others of said neuron elements, summed together.

2. A system as in claim 1 wherein said variable resistor comprises a plurality of resistor elements in parallel with one another, and a plurality of switching means in series between respective ones of said parallel resistor elements, so that different ones of said switching means can be actuated to connect different resistor elements to provide different equivalent resistance values.

3. A system as in claim 2 wherein said variable resistor comprises:

a first resistance having first and second ends, one of said ends being connected to said output of said threshold switching element and another of said ends being connected to an input of an operational amplifier of another one of said plurality of neuron elements;

a second resistance element having first and second ends, with said second end of said second resistance element connected to said second end of said first resistance element;

a first of said switching means being connected between said first end of said first resistance element and said first end of said second resistance element to thereby provide said first and second resistance elements in parallel when said first switching means is actuated to be on and said first resistance element only when said first switching means is actuated to be off.

4. A system as in claim 1 wherein said threshold switching element is a transistor.

5. A system as in claim 4 further comprising a blocking diode between said output of said operational amplifier and a base of said transistor.

6. A system as in claim 5 further comprising an RC network coupled to an input of said operational amplifier.

7. A system as in claim 4 wherein said output of said threshold switching element so said signal summing means is from an emitter of said transistor.

8. A system as in claim 7 further comprising a resistor at an output of said transistor.

9. A system as in claim 2 wherein said operational amplifier is sensitive to current signals, said output of said threshold switching element is a current limited signal which is a relatively high current in said first predetermined conducting state and a relatively low current when not in said first predetermined conducting state, and currents into said operational amplifier are summed at a node between said signal summing means and said input signals.

10. A system as in claim 1 wherein said operational amplifier is sensitive to current signals, said output of said threshold switching element is a current-limited signal which is a relatively high current in said first predetermined conducting state and a relatively low current when not in said first predetermined conducting state, and currents into said operational amplifier are summed at a node between said signal summing means and said input signals.

11. A neural network element which provides weighting of an input using a thresholding function, comprising:

an operational amplifier for amplifying an input signal, said input signal comprising a sum of an input signal for the neuron element and signals from other neuron elements;

means, including a variable resistor, for receiving said signals for said other neuron elements and weighting said signals by an adjustable amount and outputting said weighted signals to said operational amplifier; and thresholding means, comprising a p-n junction of a semiconductor element, connected to an output of said operational amplifier, for outputting a signal only when said output of said operational amplifier exceeds a threshold.

12. An element as in claim 11 wherein said variable resistance comprises a plurality of resistor elements in parallel with one another, and a plurality of switching means in series between respective parallel elements, so that different ones of said switching means can be actuated to provide different equivalent resistance values.

13. An element as in claim 11 wherein said thresholding means is a transistor and a threshold thereof is a base-emitter voltage thereof.

14. A neural network system comprising:

a plurality of neuron elements, each said neuron element comprising:

means for receiving a signal from at least one other neuron element;

means for adjusting a weighting of said at least one output signal from said at least one other neuron element, said means including a plurality of resistor elements in parallel with one another, and a plurality of switching means in series between respective ones of said parallel resistor elements, so that different ones of said switching means can be actuated to connect different resistor elements;

means for receiving an input signal for said each neuron element, said weighted signal and said input signal being summed at a node therebetween; and means for amplifying a sum of said weighted signal and said input signal to provide an output signal which is coupled to others of said neuron elements.

15. A system as in claim 14 wherein said amplifying means comprises a first amplifier, and a thresholding means connected to an output of said first amplifier which produces an output only when said output of said first amplifier exceeds a predetermined threshold.

16. A system as in claim 15 wherein said thresholding means is a transistor and said first amplifier is an operational amplifier.

* * * * *